US012602748B2

(12) United States Patent
Boiarov et al.

(10) Patent No.: US 12,602,748 B2
(45) Date of Patent: Apr. 14, 2026

(54) AUTOMATICALLY ENHANCING IMAGE QUALITY IN MACHINE LEARNING TRAINING DATASET BY USING DEEP GENERATIVE MODELS

(71) Applicants: Constructor Technology AG, Schaffhausen (CH); Constructor Education and Research Genossenschaft, Schaffhausen (CH)

(72) Inventors: Andrei Boiarov, Sofia (BG); Igor Bykovskih, Istanbul (TR); Nikita Koritsky, Istanbul (TR); Ilya Shimchik, Istanbul (TR); Serg Bell, Singapore (SG); Stanislav Protasov, Singapore (SG); Nikolay Dobrovolskiy, Istanbul (TR); Sergey Ulasen, Singapore (SG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 268 days.

(21) Appl. No.: 18/322,312

(22) Filed: May 23, 2023

(65) Prior Publication Data

US 2024/0394835 A1    Nov. 28, 2024

(51) Int. Cl.
G06T 5/60          (2024.01)
G06V 10/98         (2022.01)

(52) U.S. Cl.
CPC .............. G06T 5/60 (2024.01); G06V 10/993 (2022.01); G06T 2207/20084 (2013.01)

(58) Field of Classification Search
None
See application file for complete search history.

(56) References Cited

U.S. PATENT DOCUMENTS 10,235,608 B2 *   3/2019   Chokshi .............. G06V 10/454
11,055,819 B1     7/2021   Kunwar et al.
(Continued)

FOREIGN PATENT DOCUMENTS

CN        109903223 A        6/2019
CN        112446826 A        3/2021
(Continued)

OTHER PUBLICATIONS

Blind Image Quality Assessment for Authentic Distortions by Intermediary Enhancement and Iterative Training, Song et al. (Year: 2022).*

*Primary Examiner* — Vu Le
(74) *Attorney, Agent, or Firm* — ESPE Legal Consultancy FZ-LLC

(57) ABSTRACT

Systems and methods for automatically enhancing the quality of images in the training set of a neural network NN. A method includes gaining access to a training set including a plurality of images. Using at least one image quality assessment method, at least one image is identified from a plurality of images in the training set, which matches a low-quality criterion as at least one low-quality image. At least one image enhancement method is used for enhancing the at least one low-quality image to obtain at least one enhanced image. The at least one low-quality image is replaced with the corresponding at least one enhanced image in the training set.

20 Claims, 3 Drawing Sheets

(56)     References Cited

U.S. PATENT DOCUMENTS

| | | | | |
|---|---|---|---|---|
| 12,266,089 | B2 * | 4/2025 | Yang | G06N 3/04 |
| 2016/0358321 | A1 * | 12/2016 | Xu | G06N 3/045 |
| 2016/0379352 | A1 * | 12/2016 | Zhang | G06N 3/04 |
| | | | | 382/157 |
| 2019/0122115 | A1 * | 4/2019 | Wang | G06V 10/82 |
| 2019/0362484 | A1 * | 11/2019 | Po | G06N 3/045 |
| 2022/0138500 | A1 * | 5/2022 | Levinshtein | G06T 5/20 |
| | | | | 382/159 |
| 2023/0316577 | A1 * | 10/2023 | Ollila | G06T 7/80 |
| | | | | 345/619 |
| 2024/0029460 | A1 * | 1/2024 | Brown | G06V 10/82 |
| 2024/0268700 | A1 * | 8/2024 | Liu | G06T 7/11 |
| 2024/0303783 | A1 * | 9/2024 | Aakerberg | G06T 3/4053 |
| 2024/0331094 | A1 * | 10/2024 | Pouyanfar | G06T 5/60 |
| 2025/0061547 | A1 * | 2/2025 | Hwang | G06T 5/60 |

FOREIGN PATENT DOCUMENTS

| | | |
|---|---|---|
| CN | 107767343 B | 8/2021 |
| JP | 2022128196 A | 9/2022 |
| KR | 20190110965 A | 10/2019 |
| KR | 20200140713 A | 12/2020 |
| KR | 20210116922 A | 9/2021 |

* cited by examiner

100

300

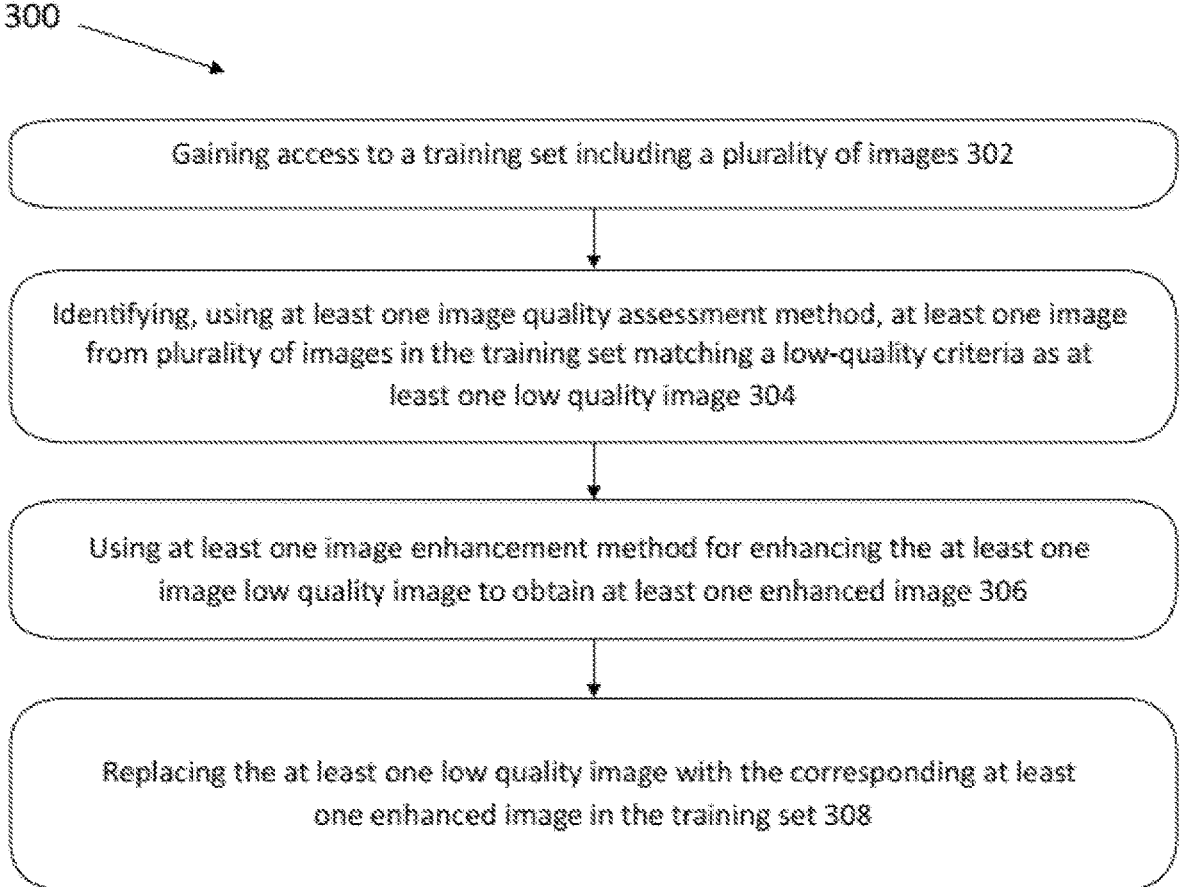

Gaining access to a training set including a plurality of images 302

Identifying, using at least one image quality assessment method, at least one image from plurality of images in the training set matching a low-quality criteria as at least one low quality image 304

Using at least one image enhancement method for enhancing the at least one image low quality image to obtain at least one enhanced image 306

Replacing the at least one low quality image with the corresponding at least one enhanced image in the training set 308

FIG. 3

AUTOMATICALLY ENHANCING IMAGE QUALITY IN MACHINE LEARNING TRAINING DATASET BY USING DEEP GENERATIVE MODELS

TECHNICAL FIELD

The present disclosure generally relates to the field of machine learning. In particular, the present disclosure relates to systems and methods for automatically enhancing image quality in Machine Learning (ML) training datasets.

BACKGROUND

Training data is key to any machine learning model. For the effectiveness of the training data set, the amount of data and cleanliness of the data plays an important role in maintaining accuracy for all machine learning algorithms. The training data sets are especially important for supervised learning models, which are trained on libelled datasets.

Due to the proliferation of data on the internet in recent times, it is necessary to make regular augmentations to the training datasets. In accordance with some typical implementations, large datasets are collected using automatic or automated tools, where large audiences assist in labelling efforts. In some cases, it is crucial to minimize the learning time for the machine learning system. In such a case, a situation is common when a sufficient number of learning items have been collected and labelled but the portions of images used in convolution neural networks are too small to produce an image fragment of a sufficient quality for the machine learning system to correctly learn from the image fragment.

Thus, there is a need for systems and methods for automatically enhancing image quality in machine learning training datasets so that the same can be used by the machine learning system for correct learning and training.

SUMMARY

In an embodiment, the present disclosure describes a method for automatically enhancing the quality of images in a training set of a neural network NN. The method includes gaining access to a training set including a plurality of images. Using at least one image quality assessment method, at least one image is identified from a plurality of images in the training set, which matches a low-quality criterion as at least one low-quality image. At least one image enhancement method is used for enhancing the at least one low-quality image to obtain at least one enhanced image. The at least one low-quality image is replaced with the corresponding at least one enhanced image in the training set.

In an embodiment, gaining access to the training set includes gaining access to one or more user devices, databases, cluster storages, cloud storages, or databases.

In an embodiment, the image quality assessment method includes at least one of IQA via DNN features method, DeepSIM method, LPIPS method, DeepQA method, WA-DIQaM-FR method, PieApp method, PIPAL method, or DISTS method.

In an embodiment, the image quality enhancement method is at least one of image Super-Resolution ML, denoising using variational autoencoders, Generative Adversarial Networks (GANs), diffusion models, and flow-based models. In an embodiment, the image Super-Resolution ML further includes at least one of pre-upsampling super resolution, post-upsampling super resolution, residual networks, multi-stage residual networks, recursive networks, progressive reconstruction networks, multi-branch networks, attention-based networks, or generative models.

In an embodiment, enhancing the at least one low-quality image further includes checking the updated training set for presence of low-quality images and repeating the execution of the method.

In an embodiment, after execution of the method is repeated a predetermined number of times, if low-quality images are present in the training set, then the low-quality images are automatically removed from the training set.

In an embodiment, removing images from the training set is followed by checking for the sufficiency of the training set to train the neural network NN.

In an embodiment, checking for sufficiency is followed by generating at least one additional image and adding to the training set using at least one of the augmentation methods.

In an embodiment, the present disclosure also describes a system for automatically enhancing the quality of images in the training set of a neural network NN. The system includes a data storage including a plurality of images. An image quality assessor is configured to identify, using at least one image quality assessment method, at least one image from a plurality of images in the training set matching a low-quality criterion as at least one low-quality image. An image quality enhancer is configured to use at least one image enhancement method for enhancing the at least one low-quality image to obtain at least one enhanced image and replace the at least one low-quality image with the corresponding at least one enhanced image in the training set.

In an embodiment, the data storage includes one or more user devices, databases, cluster storages, cloud storages, or databases.

In an embodiment, the image quality assessment method includes at least one of IQA via DNN features method, DeepSIM method, LPIPS method, DeepQA method, WA-DIQaM-FR method, PieApp method, PIPAL method, or DISTS method.

In an embodiment, the image quality enhancement method is at least one of image Super-Resolution ML, denoising using variational autoencoders, Generative Adversarial Networks (GANs), diffusion models, and flow-based models. In an embodiment, the image Super-Resolution ML further includes at least one of pre-upsampling super resolution, post-upsampling super resolution, residual networks, multi-stage residual networks, recursive networks, progressive reconstruction networks, multi-branch networks, attention-based networks, or generative models.

In an embodiment, the image quality assessor is further configured to check the updated training set for presence of low-quality images, and the image quality enhancer is further configured to enhance the low-quality images and replace the low-quality images with enhanced images.

In an embodiment, the after execution of the image quality assessor and the image quality enhancer is repeated a predetermined number of times, if low-quality images present in the training set, then the low-quality images are automatically removed from the training set.

In an embodiment, the system further includes a sufficiency evaluator configured to identify if the training set is sufficient to train the neural network NN based on at least one sufficiency criterion after the removal of the low-quality images from the training set.

In an embodiment, the system further includes a data augmentation module configured to generate at least one additional image using a generative convolutional neural network trained on the remaining training set and adding the at least one additional image to the training set if the training set is determined to be insufficient to train the neural network NN after the removal of the low-quality images.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3 is a flowchart of a method for automatically enhancing image quality in ML training dataset, in accordance with another embodiment of the present disclosure.

Figure 1:
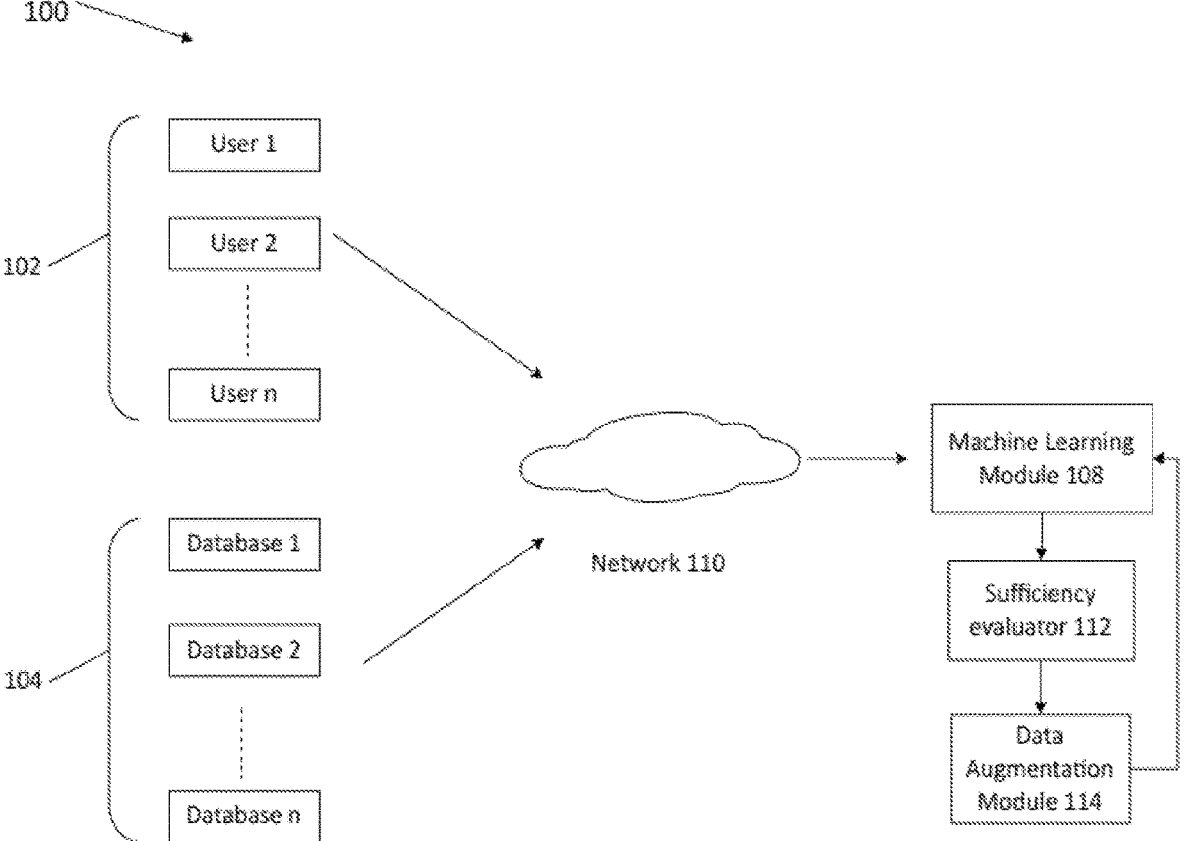
FIG. 1 is a block diagram of an environment for automatically enhancing image quality in ML training dataset, in accordance with an embodiment of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments described herein include systems and methods for automatically enhancing image quality in Machine Learning, hereinafter referred to as ML, training datasets so that the same can be used by the ML system for learning correctly therefrom.

Referring to FIG. 1, a block diagram of an environment 100 for automatically enhancing image quality in ML training datasets is depicted, in accordance with an embodiment of the present disclosure. The environment 100 includes a plurality of users 102 and a plurality of databases 104 connected to a machine learning module 108 by a network 110. In an embodiment, the network 110 can be the internet. The plurality of users 102 are the users of the machine learning module 108, while the plurality of databases 104 are the databases used for augmenting the machine learning module 108. As will be described, in certain embodiments, the machine learning module 108 can be augmented in real time.

The environment 100 further includes a sufficiency evaluator 112 and a data augmentation module 114. The operation of the sufficiency evaluator 112 and the data augmentation module 114 are explained in the subsequent sections of the present disclosure.

The system includes various engines (or modules, etc.), each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 2:
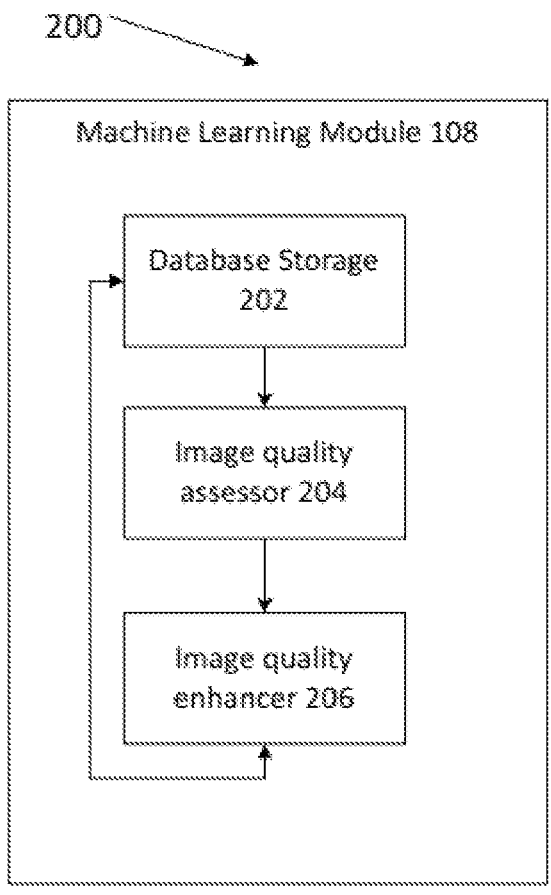
FIG. 2 is a block diagram of a system for automatically enhancing image quality in ML training dataset, in accordance with another embodiment of the present disclosure.

Referring to FIG. 2, a block diagram of a system 200 for automatically enhancing image quality in ML training dataset is depicted, in accordance with another embodiment of the present disclosure. The system 200 includes a data storage 202 that includes a plurality of images. In an embodiment, the plurality of images can include high quality images and low-quality images. In accordance with the present disclosure, the system 200 is configured to convert low-quality images into high quality images for improving the quality of the training set in the data storage 202. In an embodiment, the data storage 202 includes one or more user devices, databases, cluster storages, cloud storages, or databases.

The system 200 includes an image quality assessor 204 configured to identify, using at least one image quality assessment method, at least one image from a plurality of images in the training set matching a low-quality criterion as at least one low-quality image. In an embodiment, the image quality assessment method used by the image quality assessor 204 includes at least one of Image Quality Assurance (IQA) via Deep Neural Network (DNN) features method, Deep similarity for image quality assessment (DeepSIM) method, Learned Perceptual Image Patch Similarity (LPIPS) method, Deep Quality Assurance (DeepQA) method, Weighted Average Deep Image Quality Measure for FR (WA-DIQaM-FR) method, Perceptual Image-Error Assessment through Pairwise Preference (PieApp) method, Perceptual Image Processing Algorithms (PIPAL) method, or Deep Image Structure and Texture Similarity (DISTS) method.

The system 200 further comprises an image quality enhancer 206. The image quality enhancer 206 is configured to use at least one image enhancement method for enhancing the at least one low-quality image to obtain at least one enhanced image and replace the at least one low-quality image with the corresponding at least one enhanced image in the training set. In an embodiment, the image quality enhancement method is at least one of image Super-Resolution ML, denoising using variational autoencoders, Generative Adversarial Networks (GANs), diffusion models, or flow-based models. In an embodiment, the image Super-Resolution ML further includes at least one of pre-upsampling super resolution, post-upsampling super resolution, residual networks, multi-stage residual networks, recursive networks, progressive reconstruction networks, multi-branch networks, attention-based networks, and generative models.

In an embodiment, the image quality assessor 204 is further configured to check the updated training set for presence of the low-quality images, and the image quality enhancer 208 is further configured to enhance the low-quality images and replace the low-quality images with enhanced images. According to one implementation, the image quality assessor 204 and the image quality enhancer 208 can be configured for timed operation for monitoring and improving the image quality of the images in the training set. More specifically, in an embodiment, after execution of the image quality assessor 206 and the image quality enhancer 208 is repeated a certain number of times, if low-quality images are still present in the training set, then the low-quality images are automatically removed from the training set. In an embodiment, the number of times can be predetermined. In other embodiments, the number of times can be user-defined. In another embodiment, the threshold value can be dynamically-generated based on historical data.

Referring back to FIG. 1, the system 200 further includes a sufficiency evaluator 112 configured to identify if the training set is sufficient to train the neural network NN based on at least one sufficiency criterion after the removal of the low-quality images from the training set. The sufficiency criterion is often based in modern complex systems on the heuristic analysis of known systems of similar nature and similar number of degrees of freedom of NN. For example, the heuristic rule may determine that the model requires $N*D$ or $D^2$, where D is the number of degrees of freedom of the neural network, and N is a number. The data augmentation module 114 is configured to generate at least one additional image using a generative convolutional neural network trained on the remaining training set and adding the at least one additional image to the training set if the training set is determined to be insufficient to train the neural network NN after the removal of the low-quality images.

Referring to FIG. 3, a flowchart of a method 300 for automatically enhancing image quality in ML training dataset is depicted, in accordance with another embodiment of the present disclosure. The order in which the method 300 is described is not intended to be construed as a limitation, and any number of the described method blocks can be combined in any order to implement the method or similar alternative methods. Additionally, individual blocks can be deleted from the method without departing from the scope of the subject matter described herein. Furthermore, the method can be implemented in any suitable hardware, software, firmware, or combination thereof.

At block 302, the method 300 includes gaining access to a training set including a plurality of images. In an embodiment, gaining access to the training set comprises gaining access to one or more user devices, databases, cluster storages, cloud storages, or databases.

At block 304, the method 300 includes identifying, using at least one image quality assessment method, at least one image from a plurality of images in the training set matching a low-quality criterion as at least one low-quality image. In an embodiment, the image quality assessment method includes at least one of IQA via DNN features method, DeepSIM method, LPIPS method, DeepQA method, WA-DIQaM-FR method, PieApp method, PIPAL method, or DISTS method.

At block 306, method 300 includes using at least one image enhancement method for enhancing the at least one low-quality image to obtain at least one enhanced image. In an embodiment, the image quality enhancement method is at least one of image Super-Resolution ML, denoising using variational autoencoders, Generative Adversarial Networks (GANs), diffusion models, or flow-based models. In an embodiment, the image Super-Resolution ML further includes at least one of pre-upsampling super resolution, post-upsampling super resolution, residual networks, multi-stage residual networks, recursive networks, progressive reconstruction networks, multi-branch networks, attention-based networks, and generative models.

At block 308, method 300 includes replacing at least one low-quality image with the corresponding at least one enhanced image in the training set. Accordingly, in an embodiment, low quality images are identified in the training set and subsequently enhanced and replaced, but the generative neural network is first taught with the non-identified remaining images. Advantageously, this allows for efficiencies in training as certain subsets in the training set can still be utilized. Without the embodiments described herein, in a system requiring a certain quality of output, the training set may be insufficient to train a neural network if low quality images are removed from it or it may produce output of a lower quality than required.

In an embodiment, after the enhanced images are replaced in the training set, method 300 includes checking the updated training set for presence of low-quality images and repeating the execution of the method. Execution of the method refers to operating the image quality assessor 204 and the image quality enhancer 206 until there are no low-quality images present in the training set.

If, however, even after executing the method 300 using the image quality assessor 204 and the image quality enhancer 206 a certain number of times, low-quality images are still present in the training set, then the method 300 further includes automatically removing the low-quality images from the training set. In an embodiment, the number of times can be predetermined. In other embodiments, the number of times can be user-defined. In another embodiment, the threshold value can be dynamically-generated based on historical data. In an embodiment, removing the low-quality images from the training set is facilitated by the image quality enhancer 208.

After the low-quality images are removed from the training set, method 300 includes checking for the sufficiency of the training set of the neural network or the machine learning module 108. In an embodiment, checking is performed by the sufficiency evaluator 112. If it is deemed that the training set is insufficient, then method 300 includes generating at least one additional image and adding to the training set using at least one of the augmentation methods. In an embodiment, adding to the training set is facilitated by the data augmentation module 114.

The invention claimed is:

1. A method for automatically enhancing the quality of images in a training set of a neural network NN, the method comprising:

gaining access to the training set including a plurality of images;

identifying, using an image quality assessment method, an image from the plurality of images in the training set matching a low-quality criterion as a low-quality image;

using an image enhancement method for enhancing the low-quality image to obtain an enhanced image;

replacing the low-quality image with the corresponding enhanced image in the training set;

wherein the image enhancement method further comprises checking the training set for presence of low-quality images and repeating the execution of the method for automatically enhancing the quality of images, wherein after the method steps of identifying, enhancing, and replacing are repeated a predetermined number of times, the low-quality images from the training set are removed automatically if the low-quality images are determined to be present in the training set; and checking for sufficiency of the training set to train the neural network NN after removing the low-quality images from the training set.

2. The method of claim 1, wherein the gaining access to the training set comprises gaining access to one or more user devices, databases, cluster storages, cloud storages, or databases.

3. The method of claim 1, wherein the image quality assessment method includes at least one of IQA via DNN features method, DeepSIM method, LPIPS method, DeepQA method, WA-DIQaM-FR method, PieApp method, PIPAL method, or DISTS method.

4. The method of claim 1, wherein the image quality enhancement method is at least one of image Super-Resolution ML, denoising using variational autoencoders, Generative Adversarial Networks (GANs), diffusion models, or flow-based models.

5. The method of claim 4, wherein the image Super-Resolution ML further comprises at least one of pre-upsampling super resolution, post-upsampling super resolution, residual networks, multi-stage residual networks, recursive networks, progressive reconstruction networks, multi-branch networks, attention-based networks, or generative models.

6. The method of claim 1, further comprising generating an additional image and adding to the training set using an augmentation method after the checking for sufficiency of the training set to train the neural network NN.

7. The method of claim 1, wherein the neural network NN is initially trained with non-identified remaining images before the enhancing and the replacing.

8. The method of claim 1, wherein the method steps of identifying, enhancing, and replacing are repeated the predetermined number of times until no low-quality images are present in the training set.

9. The method of claim 1, wherein the sufficiency of the training set is determined according to a heuristic analysis of a known system.

10. The method of claim 9, wherein the sufficiency of the training set is further determined according to a degree of freedom of the neural network NN.

11. A system for automatically enhancing the quality of images in the training set of a neural network NN, the system comprising:

a data storage including a plurality of images;

an image quality assessor configured to identify, using an image quality assessment method, an image from the plurality of images in the training set matching a low-quality criterion as a low-quality image;

an image quality enhancer configured to;

use an image enhancement method for enhancing the low-quality image to obtain an enhanced image and replace the low-quality image with the corresponding enhanced image in the training set, and check the training set for presence of low-quality images; and wherein the image quality enhancer is further configured to enhance the low-quality images and replace the low-quality images with enhanced images;

wherein after execution of the image quality assessor and the image quality enhancer is repeated a predetermined number of times, if low-quality images are present in the training set, automatically removing the low-quality images from the training set; and a sufficiency evaluator configured to identify if the training set is sufficient to train the neural network NN based on at least one sufficiency criterion after the removal of the low-quality images from the training set.

12. The system of claim 11, wherein the data storage includes one or more user devices, databases, cluster storages, cloud storages, or databases.

13. The system of claim 11, wherein the image quality assessment method includes at least one of IQA via DNN features method, DeepSIM method, LPIPS method, DeepQA method, WA-DIQaM-FR method, PieApp method, PIPAL method, or DISTS method.

14. The system of claim 11, wherein the image quality enhancement method is at least one of image Super-Resolution ML, denoising using variational autoencoders, Generative Adversarial Networks (GANs), diffusion models, or flow-based models.

15. The system of claim 14, wherein the image Super-Resolution ML further comprises at least one of pre-upsampling super resolution, post-upsampling super resolution, residual networks, multi-stage residual networks, recursive networks, progressive reconstruction networks, multi-branch networks, attention-based networks, or generative models.

16. The system of claim 11, further comprising:

a data augmentation module configured to generate at least one additional image using a generative convolutional neural network trained on a remaining training set and adding the at least one additional image to the training set if the training set is determined to be insufficient to train the neural network NN after the removal of the low-quality images.

17. The system of claim 11, wherein the neural network NN is initially trained with non-identified remaining images before the obtaining of the enhanced image and the replacing the low-quality image.

18. The system of claim 11, wherein execution of the image quality assessor and the image quality enhancer is repeated the predetermined number of times until no low-quality images are present in the training set.

19. The system of claim 11, wherein the sufficiency of the training set is determined according to a heuristic analysis of a known system.

20. The system of claim 19, wherein the sufficiency of the training set is further determined according to a degree of freedom of the neural network NN.

\* \* \* \* \*